April 24, 1951     O. SCHNEPP     2,550,090
SOLDERING TOOL
Filed Feb. 12, 1949
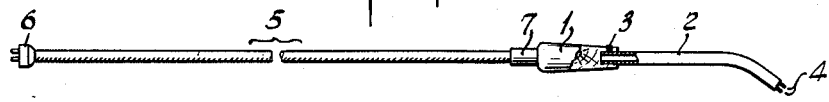
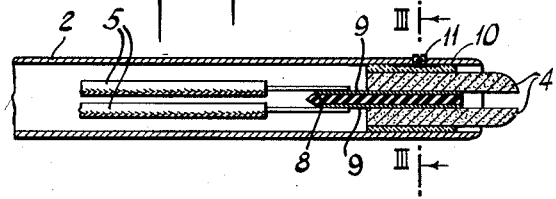 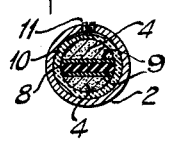
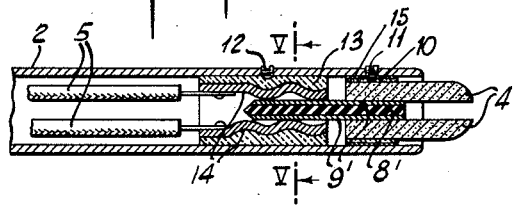 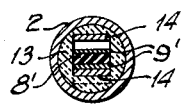
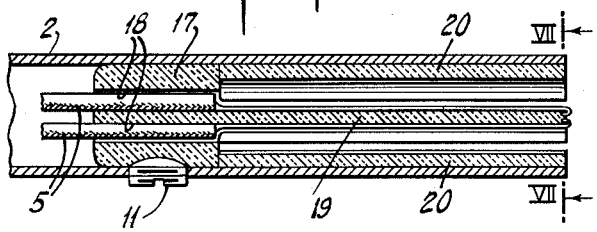 
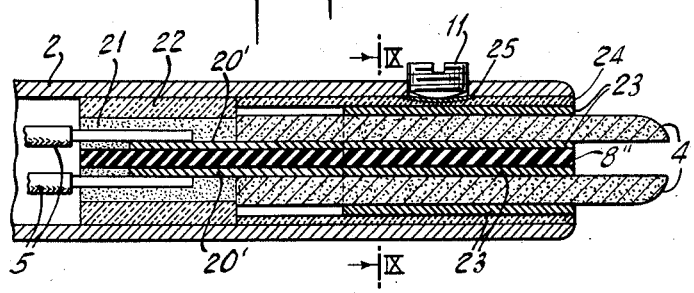 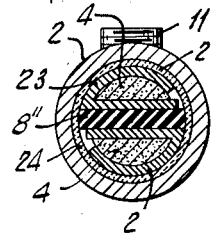
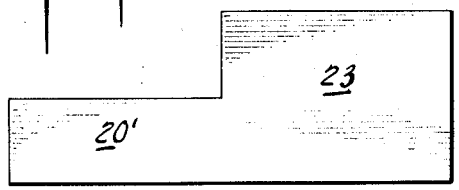
INVENTOR
OTTMAR SCHNEPP.
BY K. A. Mayr
ATTORNEY Patented Apr. 24, 1951

2,550,090

UNITED STATES PATENT OFFICE 2,550,090

SOLDERING TOOL

Ottmar Schnepp, Fellbach, near Stuttgart, Germany, assignor to William C. Palmer, New York, N. Y.

Application February 12, 1949, Serial No. 76,110
In Austria July 20, 1948

2 Claims. (Cl. 219—26)

1

The present invention relates to an electric soldering tool which is particularly suitable for small soldering work at places of limited accessibility as is the case in automatic telephone installations, radio and television equipment, the electrical systems of automobiles and aircraft, and the like.

An object of the present invention is the provision of an electric soldering tool having two electrodes protruding from a common holder which tool is characterized by its light weight and pointed pencil-like configuration for performing very delicate soldering operations. In spite of its light weight and small diameter the tool is perfectly safe for large current flow for soft- as well as hard-soldering. It is electrically and heat insulated except for the tips of the electrodes and can be held safely very close to the tips.

A further object of the invention is the provision of a soldering tool of the type set forth above in which the extent of the protrusion of the electrode points from the holder can be conveniently adjusted and the electrodes replaced without difficulty.

An object of the invention is the provision of a soldering tool of the aforesaid type in which the electrodes with insulation therearound form a compact, cartridge-like unit which can easily be inserted into and removed from the holder whereby the plug or cartridge containing the electrodes makes automatically a reliable electric connection with electric terminals disposed permanently in the holder.

The tool according to the invention has no parts which accumulate heat and is therefore fundamentally different from conventional soldering irons. The heat is generated electrically solely at the portion of the work where soldering is required and there is no waste of energy or of time for heating other bodies.

Further and other objects of the present invention will be hereinafter set forth in the accompanying specification and claims and shown in the drawings which, by way of illustration, show what I now consider to be preferred embodiments of my invention.

In the drawings:

Fig. 1 is a side view with parts broken off of the assembled soldering tool according to the invention.

Fig. 2 is a longitudinal sectional view of the head portion of the tool according to the invention.

Fig. 3 illustrates a cross section through the part shown in Fig. 2, the section being along line III—III of Fig. 2.

2

Fig. 4 is a longitudinal sectional view of a modified head portion of the tool according to the invention.

Fig. 5 is a section on line V—V of Fig. 4.

Fig. 6 is a longitudinal section of a further modification of the head of the tool according to the invention.

Fig. 7 is a section on line VII—VII of Fig. 6.

Fig. 8 is a longitudinal sectional view of a fourth modification of the head portion of the tool according to the invention.

Fig. 9 is a section on line IX—IX of Fig. 8.

Fig. 10 shows a blank of a part used in the construction according to Figs. 8 and 9.

Like parts are designated by like numerals in all figures of the drawing.

Referring more particularly to Fig. 1, numeral I designates a handle made, for example, of wood. A tube 2, preferably made of aluminum and forming the sheath of the head portion of the soldering tool is inserted in the handle and held therein by a set screw 3. From the free end of tube 2 project the points 4 of the electrodes. An electric cord 5 extends from tube 2 through handle I and projects from the rear thereof and terminates in a plug 6. Where it emerges from the handle it is protected by a rubber sleeve, coil spring, or the like. The tube 2 is bent to adapt it to the conditions of the installation where soldering must be done.

Figs. 2 and 3 illustrate a head piece of the new electric soldering tool. It consists of a tubular sheath 2 into the front end of which a replaceable electrode unit is inserted. This unit comprises a flat insulating member 8 which separates the two flat electric conductors 9 and insulates electrically as well as thermally. The electrodes 4 are made by longitudinally splitting solid, round carbon sticks into halves and the resultant flat surfaces are individually in intimate contact with the conductors 9. On the outside, the forward ends of the electrodes are rounded. Heat resisting electric insulating material 10 is wrapped around the electrodes with the conductors 9 and the insulating strips therein between.

The insulating member 8 with adjacent conductors 9 projects from the rear of the unit and the ends of the electric wires 5 are pulled out of the front end of tube 2 for connecting the wires individually to the conductors 9. Then the unit is pushed into the front end of tube 2 to an extent suitable for the soldering job to be done and held therein by a set screw 11.

The tool is now ready for use. When it is desired to insert a new unit, plug or cartridge, the old one is pulled out of tube 2, after loosening screw 11, and the wires 5 are cut for connecting the conductors of the new unit.

In the modification of the tool head shown in Figs. 4 and 5, the ends of wires 5 are permanently connected to a contact element which is inserted in tube 2 and held therein by a screw 12. The contact element consists of a cylindrical part 13 made of heat resisting insulating material and having an aperture of rectangular cross section and undulating longitudinal section. The wire walls of the aperture are lined with electrically conducting laminae 14 to the rear end of which the wires 5 are connected. The head unit or plug is constructed as in Figs. 2 and 3 and has two electrodes 4 separated by a heat resisting, flat electric insulating member 8' which is covered at its broad sides which contact the flat sides of the electrodes, by electrically conductive metal laminae 9'. The width of the rearwardly projecting portion of the separating member 8', 9' is somewhat smaller than the interior diameter of tube 2 for insertion in the aperture in member 13, 14. Due to the undulated interior of the aperture a firm contact of the laminae 9' and 14 is assured. The insulating part 10 may be surrounded by a metal tube 15 for making it more resistant to the pressure of set screw 11.

In the modification according to Figs. 4 and 5 the electrodes can be changed by loosening screw 11 and just pulling the plug of which the electrodes are a part, out of tube 2 and inserting a new plug. No cutting of wires 5 and connecting to the new plug is required. The new plug is just pushed into tube 2 to the position most suitable for the job at hand and fixed there by tightening screw 11.

Figs. 6 and 7 illustrate an arrangement consisting of a plug 17 made of heat resisting electrically insulating material and having a solid cylindrical rear portion with two holes 18 drilled therethrough for receiving wires 5. From the center of the rear portion of the plug a flat portion 19 extends forward having a cross section somewhat like the letter Z. The wires extending forward from holes 18 are flattened and laid on the flat surfaces of portion 19. The forward ends of the wires are bent over and embedded in the forward end of portion 19 as seen in Fig. 6. The electrodes 4 which are shown in Fig. 7 only, are laid with their flat sides against the flat sides of portion 19 and held in tube 2 by filler members 20 of heat resisting insulating material and preferably having somewhat smaller radii on the inside than the radii of the adjacent portion of the electrodes for improving hold. Instead of providing separate filler members, these parts may be made integral with the plug 17 extending from the rear portion thereof. The plug is held in tube 2 by a set screw 11. In this modification the electrodes can be pulled out and inserted individually. If necessary, screw 11 may be loosened and member 18, 19 with wires 5 attached pulled forward for removing the electrodes and pushed back with the new electrodes.

In the modification according to Figs. 8 to 10 metal plates of a configuration as shown in Fig. 10 are inserted with their rear portion 20' in an insulating plug 21, connected, individually, to wires 5 and separated by an insulating lamina 8'' made, for example, of quartz. Plug 21 is inserted in tube 2 and secured therein by putty 22. The forward portion 23 of the electrode holder plate shown in Fig. 10 is bent semicircularly to extend around the electrodes as seen in Fig. 9. Between portions 23 and tube 2 a tubular insulating member 24 is inserted. The electrodes are held in the desired position by set screw 11 whose pressure may be received by a tin strip 25. The electrodes can be removed and inserted individually while screw 11 is loosened.

While I believe the above described embodiments of my invention to be preferred embodiments, I wish it to be understood that I do not desire to be limited to the exact details of design and construction shown and described, for obvious modifications will occur to a person skilled in the art.

I claim:

1. A soldering tool including a tubular member, electric conduits extending into said member and projecting rearwardly therefrom, and a head unit inserted forwardly into said tubular member and comprising an insulating central flat spacer member, two electrically conductive members each having a flat longitudinal portion placed on opposite sides of said spacer member and having a rear portion connected to said conduits, an insulating body surrounding the rear portions of said spacer member and said conductive members and fitting into said tubular member, two electrodes having substantially semicircular cross section with the flat sides individually contacting the flat portions of said conductive members, said conductive members each having a longitudinal forward portion extending individually around the curved sides of said electrodes and holding same in place, and tubular insulating means adjacent to the inside of said tubular member and surrounding the semicircular portions of said conductive members with the spacer member therebetween.

2. A soldering tool as set forth in claim 1, comprising a set screw extending substantially radially through said tubular member toward one of said longitudinal forward portions for compressing said conductive members, electrodes and spacer member and pressing them against the opposite interior side of said tubular member, and a protective member between said set screw and said tubular insulating means for preventing damage thereof.

OTTMAR SCHNEPP.

REFERENCES CITED

The following references are of record in the file of this patent:

UNITED STATES PATENTS

| Number | Name | Date |
|---|---|---|
| 1,862,653 | Bean | June 14, 1932 |
| 1,869,448 | Woodring | Aug. 2, 1932 |
| 2,221,646 | McPherson | Nov. 12, 1940 |
| 2,271,987 | Newell | Feb. 3, 1942 |
| 2,504,338 | MacLatchie, Jr. | Apr. 18, 1950 |